(No Model.)

G. A. BURROUGH.
FLOWER POT.

No. 357,698. Patented Feb. 15, 1887.

Witnesses:
Albert L. Backwell
William H. Knott

Inventor:
George A. Burrough

UNITED STATES PATENT OFFICE.

GEORGE A. BURROUGH, OF PROVIDENCE, RHODE ISLAND, ASSIGNOR TO THE AMERICAN FLORAL REQUISITE COMPANY, OF NEW YORK, N. Y.

FLOWER-POT.

SPECIFICATION forming part of Letters Patent No. 357,698, dated February 15, 1887.

Application filed April 25, 1883. Serial No. 92,924. (No model.)

*To all whom it may concern:*

Be it known that I, GEORGE A. BURROUGH, a citizen of the United States, residing at Providence, in the county of Providence and State of Rhode Island, have invented a new and useful Improvement in Flower-Pots, of which the following is a specification.

My invention relates to flower-pots which are made with detachable bottoms; and it consists in the construction and combination of parts hereinafter described, and specifically pointed out in the claims.

The objects of my improvements are to provide better drainage, obviate the use of "crock," prevent worms, ants, or other insects from injuring the plants, to advantageously supply plants with volatile liquid or other fertilizers, better admit air, facilitate the examination of the roots of plants and the condition of the soil, prevent dampness and the growth of mold under the saucer, and to afford a continuous supply of moisture through the capillary action of the porous parts. I attain these objects by the construction illustrated in the accompanying drawings, in which—

Figure 1:
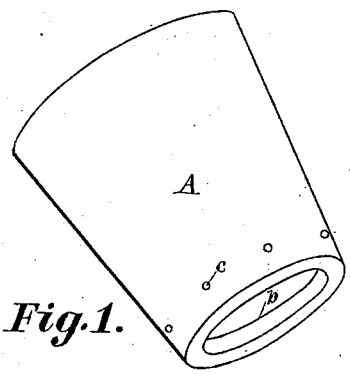
Figure 2:
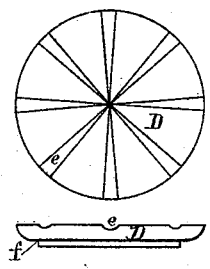
Figure 3:
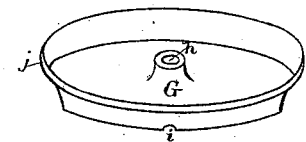
Figure 5:
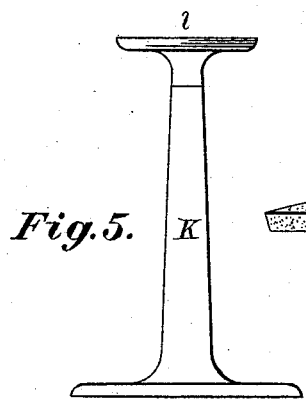
Figure 7:
Figure 4:
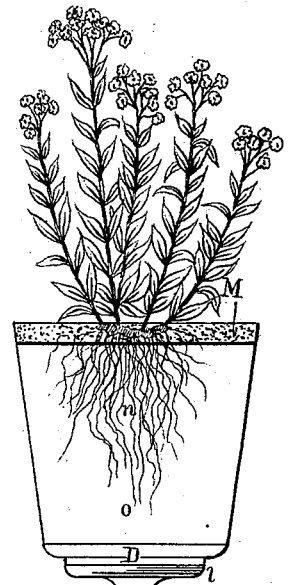
Figure 4:
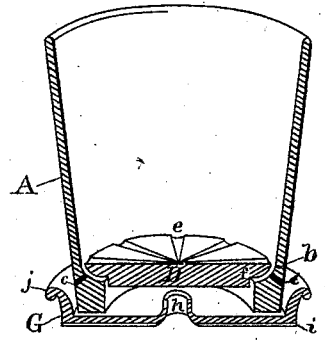
Figure 6:
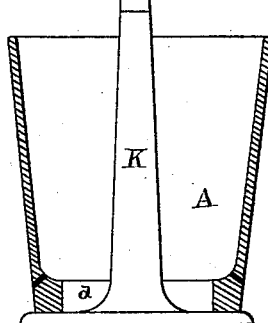

Figure 1 is a perspective view of my improved flower-pot, looking at the under side. Fig. 2 is a top and side view of the detachable bottom. Fig. 3 is a perspective view of the saucer. Fig. 4 is a sectional perspective view of the pot, detachable bottom, and saucer in position. Fig. 5 is a view in elevation of a standard used in repotting or examining the earth or roots of plants. Fig. 6 is a view showing the manner of removing a plant from the pot for repotting or examining the soil or roots, also showing the disk M in position; and Fig. 7 is a view of the disk M and porous pieces *n o p*.

Similar letters refer to similar parts throughout the several views.

A is the flower-pot, made without a bottom, but provided on the inner side near its lower end with a continuous shoulder, *b*, on which is placed a detachable or movable bottom, D, molded to form or made plain, of any suitable material, preferably of a mixture of clay and sawdust, or any equivalent mixture, having grooves *e* on its upper side to facilitate the escape of water, and a shoulder, *f*, on its under side to keep it in its place. From the center of shoulder *b* are several vents or air-passages, *c c*, for the admission of air in case the pot should be used without the saucer. The detachable bottom is made porous, and is glazed or made impervious on its under side; or it may be made porous throughout. The detachable bottom could be supported on lips or bosses and in many different ways; but I prefer using a continuous shoulder. The detachable bottom, being higher than the rim *j* of the saucer G when in position, will be above the water-line of the saucer G, and consequently the plant will be automatically relieved from all surplus water, regardless of the quantity used.

The contact of the detachable bottom with the shoulder is such as to exclude worms, ants, or other insects, and at the same time sufficiently open for the escape of water and for the free circulation of air.

The impervious saucer G has a central tube or air-duct, *h*, made plain, or with radial grooves *i i* on the under side, and of a corresponding depth to the distance between the detachable bottom and the saucer when in position, glazed, enameled, or coated with some waterproof composition, to prevent absorption of water and the growth of mold; and it also serves as a reservoir in case of casual neglect.

For repotting or for an examination of a plant, (exemplified in Fig. 6,) I use a standard, K, Fig. 5, made of any suitable material, preferably of iron, with revolving heads *l* of different sizes, so as to pass through the openings of the several sizes of pots and to give proportional support to the increasing weight put upon them; placing the standard upon a table and the pot containing the plant upon the standard, with one hand holding one side of the pot and gently tapping the opposite edge with a leaden or wooden mallet with the other, or by pressing the pot down with both hands, the roots and the soil are left exposed to view standing upon the detachable bottom on the top of the standard, easily turned by the revolving head, and in a position for a leisurely inspection. If to be returned, the pot is raised and the plant removed; but if the plant needs repotting it is set aside, the old pot removed, and a larger one put in its place, with its detachable bottom placed on the top of the standard. The plant is then returned, the new pot raised receiving the plant, which is then removed, soil added to fill the vacant space around the roots, and the operation finished.

For applying volatile liquid or other fertilizers, remove the plant, as one would for repotting, and pour or place the fertilizer upon the detachable bottom and return the plant.

I also use porous pieces M n o p, Fig. 7, in various forms whenever required, the piece or disk M to be placed on the surface of the soil, as in Fig. 6, to prevent too rapid evaporation, and the other pieces in the soil among the roots to retain the moisture. A plant so thoroughly treated has all the elements of growth within its reach—hydrogen from its reservoir through capillary action, nitrogen from the evaporation of volatile fertilizers, while from the free and constant circulation of air its oxygen, all permeating the soil with their combined nutrition, and by assimilation imparting life, vigor, and health, producing the highest attainable results.

I am aware that prior to my invention flower-pots have been made in many and various forms, and also that pots with removable bottoms are old. I therefore do not claim any of these; but What I do claim as my invention, and desire to secure by Letters Patent, is—

1. The combination of a flower-pot, having an inner shoulder near its lower end and a detachable bottom, with an impervious saucer having a central tube or air-duct, substantially as described.

2. The combination of a flower-pot, having an inner shoulder and a detachable bottom, with an impervious saucer having a central tube or air-duct and radial grooves on its under side, substantially as described.

3. The combination of a flower-pot, having an inner shoulder and a detachable bottom of porous material glazed or made impervious on its under side, with a saucer having a central tube or air-duct, substantially as described.

4. The combination of a flower-pot, having an inner shoulder and a detachable bottom, with a saucer and a porous piece, M, substantially as described.

5. The combination of a flower-pot, having an inner shoulder and a detachable bottom, with a saucer having a central tube or air-duct and porous pieces M n o p, substantially as described, for the purpose set forth.

GEORGE A. BURROUGH.

Witnesses:
ALBERT L. BODWELL,
WILLIAM H. KNOTT.